(12) United States Patent
Liu et al.

(10) Patent No.: US 8,467,818 B2
(45) Date of Patent: Jun. 18, 2013

(54) COMMUNICATION SYSTEM AND MANAGEMENT METHOD THEREOF

(71) Applicant: Huawei Technologies Co., Ltd., Guangdong (CN)

(72) Inventors: Sheng Liu, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/622,196

(22) Filed: Sep. 18, 2012

(65) Prior Publication Data

US 2013/0017852 A1  Jan. 17, 2013

Related U.S. Application Data

(63) Continuation of application No. PCT/CN2011/074184, filed on May 17, 2011.

(51) Int. Cl.
*H04W 4/00* (2009.01)

(52) U.S. Cl.
USPC ............ 455/509; 455/507; 455/444; 455/515

(58) Field of Classification Search
USPC .............. 455/509, 426.2, 428, 434, 436, 439, 455/443, 444, 446, 450, 456.5, 13.1, 16, 455/41.2, 507, 511, 515, 552.1; 370/252, 370/254, 329
See application file for complete search history.

(56) References Cited

U.S. PATENT DOCUMENTS

| | | | | |
|---|---|---|---|---|
| 2010/0238826 | A1* | 9/2010 | Borran et al. | 370/252 |
| 2010/0238827 | A1* | 9/2010 | Borran et al. | 370/252 |
| 2010/0238883 | A1* | 9/2010 | Borran et al. | 370/329 |
| 2010/0238885 | A1* | 9/2010 | Borran et al. | 370/329 |
| 2011/0085471 | A1* | 4/2011 | Zhang | 370/254 |

(Continued)

FOREIGN PATENT DOCUMENTS

| | | |
|---|---|---|
| CN | 101562900 A | 10/2009 |
| CN | 101977242 A | 2/2011 |
| WO | WO 2011050491 A1 | 5/2011 |

OTHER PUBLICATIONS

International Search Report in corresponding International Patent Application No. PCT/CN2011/074184 (Mar. 1, 2012).
Written Opinion of the International Searching Authority in corresponding International Patent Application No. PCT/CN2011/074184 (Mar. 1, 2012).

*Primary Examiner* — Tan Trinh

(74) *Attorney, Agent, or Firm* — Leydig, Voit & Mayer, Ltd.

(57) ABSTRACT

Embodiments of the present invention provide a communication system and management method thereof. The communication system includes: a radio transceiving layer, including a radio transceiving node combination, where the radio transceiving node combination includes at least one type of the following: a macro cell RRU, a Pico cell RRU, and a Pico cell BRU; a local computing layer, including a local computing node, connected to a radio transceiving node in one or multiple neighboring radio transceiving node combinations and configured to execute all communication processing or a first part of communication processing of a cell corresponding to the local computing node; a centralized computing layer, including a centralized computing node, connected to the local computing node in the local computing layer and configured to execute a second part of communication processing, where the all communication processing includes the first part and second part of communication processing.

21 Claims, 6 Drawing Sheets

U.S. PATENT DOCUMENTS

2011/0176453 A1* 7/2011 Monogioudis ................ 370/254
2012/0087257 A1* 4/2012 Larsson et al. ................ 370/252
2012/0263067 A1* 10/2012 Kim et al. ..................... 370/252
2012/0275398 A1* 11/2012 Chen et al. .................... 370/329

* cited by examiner

COMMUNICATION SYSTEM AND MANAGEMENT METHOD THEREOF

CROSS-REFERENCE TO RELATED APPLICATIONS

This application is a continuation of International Application No. PCT/CN2011/074184, filed on May 27, 2011, which is hereby incorporated by reference in its entirety.

FIELD OF THE INVENTION

The present invention relates to the field of radio communications, and in particular, to a communication system and a method thereof.

BACKGROUND OF THE INVENTION

A cellular communication system includes three parts, namely, a user equipment (UE), a radio access network (RAN), and a core network (CN). The UE is a communication tool for network users, the RAN is responsible for managing air interface resources and is a part of mobility management, and the CN is responsible for user authentication, charging, mobility management, bearer setup and maintenance, and data routing.

The RAN before LTE (Long Term Evolution, long term evolution) includes a base station and a base station controller. For a GSM (Global System of Mobile communication) GPRS (General Packet Radio Service), the RAN consists of a BS (Base Station) and a BSC (Base Station Controller). For a UMTS (Universal Mobile Telecommunications System), the RAN consists of a NodeB and an RNC (Radio Network Controller). The base station communicates with the UE through an air interface, and the base station controller performs unified management and scheduling on multiple base stations. The LTE adopts a flat network architecture. The RAN has only one network element, that is, an eNodeB, which includes functions of a previous NodeB. The functions of the base station controller are also distributed to each eNodeB.

Since 3G ($3^{rd}$ Generation), distributed base stations have been widely applied, a distributed base station divides a conventional base station into a baseband unit (BBU) and a radio remote unit (RRU). The RRU implements such operations as radio signal receiving and transmission, peak-to-average power ratio reduction, digital pre-distortion, up-conversion, DAC (Digital-to-Analog Conversion)/ADC (Analog-to-Digital Conversion), and power amplification, and exchanges baseband information with the BBU through a Common Public Radio Interface (CPRI) protocol. Conventionally, physical connections between the BBU and the RRU mostly adopt fibers. The BBU+RRU mode makes the site deployment more flexible. The RRU is smaller in size and easy to deploy at such locations as an electric pole, and occupies a smaller space. Generally, inside a large-scale building, there are floors between layers, there are walls in rooms, and there are space partitions between indoor users. According to a BBU+RRU multi-channel solution, an RRU is deployed for each partitioned space by using such features. For a large-sized stadium with the floor area over 100,000 square meters, the stand may be divided into several cells, and each cell has several channels, with each channel corresponding to an RRU equipped with a panel antenna. The BBU is larger in size, and may be placed independently in an equipment room.

The mobile communication network generally uses a cellular structure, that is, different base stations are deployed at different locations, and each base bastion forms a cell and is responsible for communication of mobile users in the cell. To ensure that the mobile users can get seamless communication, neighboring cells have certain overlapping areas, so that the mobile users can hand over from one cell to another cell. In this conventional single-layer cell system, to increase the system capacity, the capacity of each cell needs to be increased, which is generally implemented by using complex and high-cost technologies. However, within a larger area, not all places need a very high capacity. In most cases, only a part of hot areas need a high capacity; for other areas with lower traffic requirements, even if a high capacity is provided, no users will use the capacity, which is a waste of system resources. That is, it is an inefficient manner to increase the capacity of the whole cell.

A better manner is to adopt a multi-layer cell structure (i.e., Heterogeneous Network in the LTE standard of the 3GPP, "HetNet" for short). That is, a macro cell is used to implement seamless coverage of the area, and then a Pico cell (i.e., Pico or Femto) is used at hot areas to perform overlapping coverage. The Pico cell provides a high capacity according to larger traffic requirements in the hot areas, so that the system capacity can be allocated according to the actual need. From the perspective of the system, this manner is a more accurate and purposeful capacity provision manner, and thus avoids the waste of the system resources. Currently, the HetNet is regarded as an important technical means to increase the system capacity in the LTE.

Most of the users are distributed in industrial areas during working hours, while most of users are distributed in residential areas during non-working hours. With this tidal effect of the users, the computing resources of the base station cannot be fully utilized. The purpose of proposing the architecture of a Cloud-RAN (C-RAN) is to utilize the computing resources of the base station in a more efficient way.

The C-RAN centralizes BBUs of distributed base stations in an area to form a BBU resource pool. Baseband signals of the RRUs in this area are processed in the same BBU resource pool. In this way, the mobility of users in this area does not affect the utilization of computing resources.

The centralized BBUs may be connected to the RRUs in a larger area through fibers. If bandwidth and time delays of interlinks between BBUs permit, the BBUs in the area may also be interconnected to form a BBU resource pool.

Because the BBU resource pool processes signals of multiple cells in a centralized manner, the C-RAN can also facilitate the joint transmission between the multiple cells.

However, in a conventional cloud-RAN architecture, one area and cell correspond to only one BBU resource pool, and all the RRUs need to be connected to the BBU resource pool through fibers. Because the physical distance is long and all the baseband signals must be sent to the BBU resource pool for processing, requirements for the transmission capabilities of fibers are very high.

In a HetNet scenario, if all the Pico cells need to be connected to a remote BBU pool through fibers, a large number of Pico cells may double fiber laying costs and data volumes to be processed by the BBU pool.

Compared with the conventional C-RAN architecture, the present invention has the following advantages: bandwidth for the connection between the base station and the cloud computing node is greatly saved. In future communication networks, the number of the Pico cells is several times the number of macro cells; the frequency band becomes increasingly wider; and the number of the antennas is increased dramatically from four to several dozens and even over one hundred. If the conventional cloud-RAN architecture is still used, it is a big challenge for fiber transmission to connect all baseband data to the cloud computing center several kilometers away.

SUMMARY OF THE INVENTION

Embodiments of the present invention provide a communication system and management method thereof to save transmission bandwidth of data between base stations and improve resource utilization.

In one respect, a communication system is provided, including: a radio transceiving layer, including one or multiple radio transceiving node combinations, where a radio transceiving node in each radio transceiving node combination includes at least one type of the following: a macro cell radio unit, a Pico cell radio remote unit, and a Pico cell baseband and radio unit; a local computing layer, including one or multiple local computing nodes, where each local computing node is connected to radio transceiving nodes in one or multiple neighboring radio transceiving node combinations and configured to execute all communication processing or a first part of communication processing of a cell corresponding to a radio transceiving node combination connected to the local computing node; and a centralized computing layer, including one or multiple centralized computing nodes, where each centralized computing node is connected to one or multiple local computing nodes in the local computing layer, and configured to execute a second part of communication processing of a cell corresponding to a radio transceiving node combination connected to one or multiple local computing nodes if the local computing node executes the first part of communication processing, where the all communication processing includes the first part of communication processing and the second part of communication processing.

In another respect, a method for managing a communication system is provided, where the communication system includes a radio transceiving layer, a local computing layer, and a centralized computing layer. The radio transceiving layer includes one or multiple radio transceiving node combinations, where a radio transceiving node in each radio transceiving node combination includes at least one type of the following: a macro cell radio unit, a Pico cell radio remote unit, a Pico cell baseband and radio unit. The local computing layer includes one or multiple local computing nodes, where each local computing node is connected to radio transceiving nodes in one or multiple neighboring radio transceiving node combinations. The centralized computing layer includes one or multiple centralized computing nodes, where each centralized computing node is connected to one or multiple local computing nodes in the local computing layer. The method includes: executing, by the local computing node, all communication processing or a first part of communication processing of a cell corresponding to a radio transceiving node in a radio transceiving node combination connected to the local computing node; and executing, by the centralized computing node, a second part of communication processing of a cell corresponding to a radio transceiving node in a radio transceiving node combination connected to one or multiple local computing nodes if the local computing node executes the first part of communication processing, where the all communication processing includes the first part of communication processing and the second part of communication processing.

In embodiments of the present invention, a local computing layer is added between the centralized computing layer and the radio transceiving layer and is responsible for all or a part of communication processing of neighboring cells within a certain range. In this way, all the processing does not need to be performed by a remote computing center, which saves network bandwidth and improves the utilization of system resources.

BRIEF DESCRIPTION OF THE DRAWINGS

To make the technical solutions of embodiments of the present invention clearer, the accompanying drawings for illustrating the embodiments of the present invention are briefly described below. Evidently, the accompanying drawings are exemplary only, and persons of ordinary skill in the art can derive other drawings from such accompanying drawings without creative efforts.

DETAILED DESCRIPTION OF THE EMBODIMENTS

The technical solutions of embodiments of the present invention are hereinafter described clearly and completely with reference to the accompanying drawings. Evidently, the embodiments are only exemplary embodiments of the present invention and the present invention is not limited to such embodiments. All other embodiments that persons of ordinary skill in the art obtain based on embodiments of the present invention without creative efforts also fall within the scope of the present invention.

In embodiments of the present invention, computing resources of BBUs are divided by layer, so that the centralization of the localized BBUs in a small area is combined with the centralization of the globalized area BBUs in a large area. A radio transceiving node, for example, a macro cell radio unit, a Pico cell RRU, or a Pico cell BRU (Baseband and Radio Unit, baseband and radio unit), is not only connected to a local computing node but also connected to an upper layer large area computing node through the local computing node. The Pico cell BRU may have a radio processing function of the RRU and certain communication processing functions (for example, baseband data compression, and baseband and upper layer communication protocol processing). Therefore, a communication system provided in an embodiment of the present invention supports adaptive scheduling on computing resources and joint processing between the local computing node and the centralized computing node according to the user distribution, data volume, and interference.

It should be noted that in embodiments of the present invention, when two network elements are directly "connected", it indicates that the two network elements are connected through only a connection medium (for example, an air interface, a fiber, a digital subscriber line, a microwave link, or an electrical power cable) or are directly connected without any connection medium. When two network elements are "connected", it indicates that the two network elements may be connected directly or connected indirectly through one or multiple intermediate network elements. All those connection ways fall within the scope of the present invention.

Figure 1:
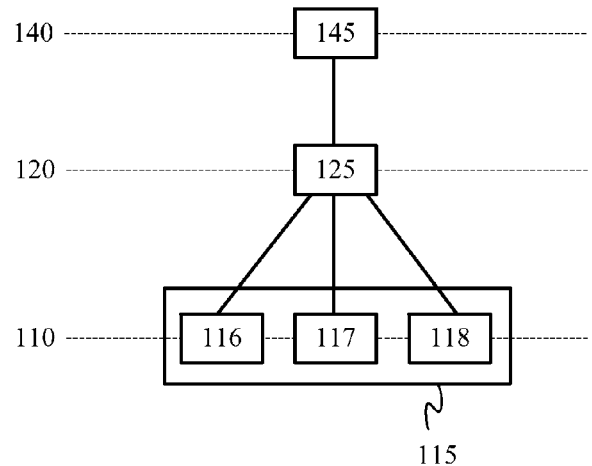
FIG. 1 is a schematic diagram of a network architecture of a communication system according to an embodiment of the present invention.

FIG. 1 is a schematic diagram of a network architecture of a communication system according to an embodiment of the present invention. In FIG. 1, to simply illustrate the system architecture provided in this embodiment of the present invention, only one network element of each type of network element is described, but is not limited in this embodiment of the present invention. Each type of network element may be increased, decreased, or deleted according to needs, and all these modifications should fall within the scope of the present invention.

As shown in FIG. 1, a radio transceiving layer 110 is located at the bottom layer of the RAN architecture and performs radio signal transmission with a user equipment through an air interface. The radio transceiving layer 110 includes one or multiple radio transceiving node combinations 115. A radio transceiving node in a radio transceiving node combination 115 includes at least one type of the following: a macro cell radio unit 116, a Pico cell radio remote unit (RRU) 117, and a Pico cell baseband and radio unit (BRU) 118. Radio transceiving nodes 116-118 perform at least radio processing functions of the base station. For example, for an LTE network, the radio processing functions include baseband data framing/deframing (for example, CPRI framing/deframing), peak-to-average power ratio reduction, digital pre-distortion, up/down-conversion, ADC/DAC (analog-to-digital/digital-to-analog conversion), power amplification, and duplexer.

FIG. 1 illustrates only a radio transceiving node combination 115, but the radio transceiving layer provided in this embodiment of the present invention may include multiple radio transceiving node combinations 115. The radio transceiving node combination 115 shown in FIG. 1 includes three radio transceiving nodes 116-118, but each radio transceiving node combination 115 provided in this embodiment of the present invention may include one, two or all of the three radio transceiving nodes 116-118, and the number of any one type of radio transceiving nodes 116-118 may be more than one. For brief description, the term "radio transceiving nodes 116-118" is used to indicate radio transceiving nodes included in any one of radio transceiving node combinations 115 and may include one or multiple types of radio transceiving nodes 116-118, and the number of each type of radio transceiving node may be one or more than one.

A local computing layer 120 is located above the radio transceiving layer 110 and the layer includes one or multiple local computing nodes 125. The local computing layer 120 is a computing layer directly connected to the radio transceiving nodes 116-118. Each local computing node 125 is connected to the radio transceiving nodes 116-118 in one neighboring radio transceiving node combination 115 or multiple neighboring radio transceiving node combinations 115, and is configured to execute all communication processing or a first part of communication processing of a cell corresponding to the radio transceiving node combination connected to the local computing node 125. The cell corresponding to the radio transceiving node combination 115 refers to a cell served by the radio transceiving nodes 116-118 in the radio transceiving node combination 115. The distance between the local computing layer 120 and the radio transceiving layer 110 is generally within a short range, for example, within a macro cell. In the case of continuous coverage of the Pico cell without macro cell coverage, the local computing node 125 may be connected to multiple Pico cell BRUs/RRUs within a small area with continuous coverage.

FIG. 1 shows only the case that one local computing node 125 is connected to the radio transceiving nodes 116-118 in one radio transceiving node combination 115. However, the local computing node 125 provided in this embodiment of the present invention may be connected to the radio transceiving nodes 116-118 in one or multiple neighboring radio transceiving node combinations 115. The number of the radio transceiving nodes in a radio transceiving node combination connected to the local computing node and the number of connected radio transceiving node combinations may be determined according to network configurations.

The centralized computing layer 140 is located at the top layer of the system architecture and the layer includes one or multiple centralized computing nodes 145. A centralized computing node 145 is connected to a local computing node 125 within a larger area, for example, it is connected to the local computing node 125 corresponding to multiple macro cells. The centralized computing layer 140 is generally far away from the local computing layer 120. A centralized computing node 145 is connected to one or multiple local computing nodes 125 of the local computing layer 120 and is configured to execute a second part of communication processing of a cell corresponding to the radio transceiving node combination 115 connected to the one or multiple local computing nodes 125 if the local computing node 125 executes the first part of communication processing, where the all communication processing includes the first part of communication processing and the second part of communication processing.

In one embodiment, the first part of communication processing and the second part of communication processing may be performed at the same time. In another embodiment, the first part of communication processing and the second part of communication processing may be performed at different time, which is not limited in embodiments of the present invention.

FIG. 1 shows only one centralized computing node 145, but the centralized computing layer 140 provided in this embodiment of the present invention may include multiple centralized computing nodes 145. The centralized computing nodes 145 may be interconnected.

In this embodiment of the present invention, a local computing layer is added between the centralized computing layer and the radio transceiving layer and is responsible for all or a part of communication processing of neighboring cells within a certain range. In this way, all the processing does not need to be performed by a centralized computing node that is far away, which saves network bandwidth and improves the utilization of system resources.

Figure 2:
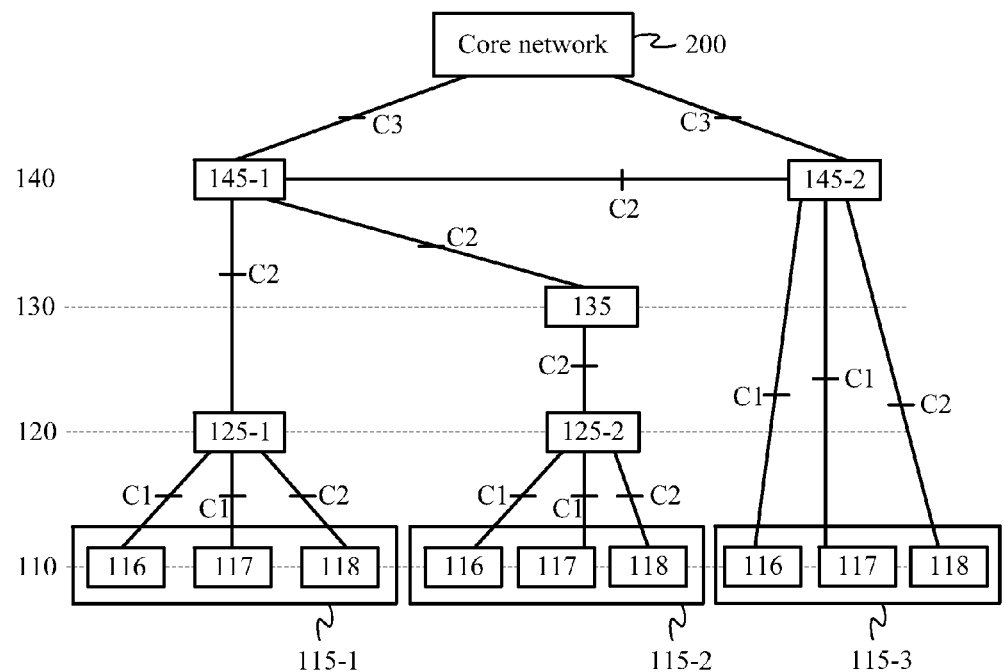
FIG. 2 is a schematic diagram of a network architecture of a communication system according to another embodiment of the present invention.

To further save bandwidth, one or multiple intermediate computing layers may be added between the centralized computing layer and the local computing layer. FIG. 2 is a schematic diagram of a network architecture of a communication system according to another embodiment of the present invention. In FIG. 2, parts the same as those in FIG. 1 are represented by the same reference numbers.

As shown in FIG. 2, an intermediate computing layer 130 may be added between the local computing layer 120 and the centralized computing layer 140. Although only one intermediate computing layer 130 is shown in FIG. 2, multiple intermediate computing layers may be included in this embodiment of the present invention. An intermediate computing layer 130 consists of intermediate computing nodes 135, where each intermediate computing node 135 is configured to execute all communication processing or a third part of communication processing of a cell corresponding to radio transceiving nodes (for example, radio transceiving nodes 116-118 included in 115-2 shown in FIG. 2) in a radio transceiving node combination connected to a locate computing node (for example, 125-2 in FIG. 2) connected to the intermediate computing node 135. Except the first part of communication processing (executed by the local computing node 125) and the second part of communication processing (executed by the centralized computing node 145), the all the communication processing further includes the third part of communication processing.

In an embodiment, the third part of communication processing, the first part of communication processing, and the second part of communication processing may be performed at the same time. In another embodiment, the third part of communication processing, the first part of communication processing, and the second part of communication processing may be performed at different time, which is not limited in embodiments of the present invention.

As shown in FIG. 2, the centralized computing nodes 145 may be connected to the radio transceiving nodes 116-118 in the radio transceiving node combination 115 through various manners. For example, a centralized computing node 145-1 is directly connected to a local computing node 125-1, and the local computing node 125-1 is directly connected to radio transceiving nodes 116-118 in a radio transceiving node combination 115-1.

Or the centralized computing node 145-1 is connected to a local computing node 125-2 through one layer or multiple layers of intermediate computing nodes 135, and the local computing node 125-2 is directly connected to the radio transceiving nodes 116-118 in the radio transceiving node combination 115-2.

Although the radio transceiving nodes 116-118 in the network architecture provided in this embodiment of the present invention are first connected to the local computing node 125, and then connected to the centralized computing node 145 through the local computing node 125, in this embodiment of the present invention, a manner similar to that in the conventional C-RAN may be further used, that is, the centralized computing node 145 is directly connected to the radio transceiving nodes 116-118. As shown in FIG. 2, the centralized computing node 145-2 may be directly connected to the radio transceiving nodes 116-118 in the radio transceiving node combination 115-3. For example, if the Pico cell RRU/BRU is located at the border between two macro cells, Pico cell users usually need to perform joint processing with multiple macro base stations from the perspective of resource scheduling and interference management. In this case, the Pico cell RRU/BRU may be directly connected to the centralized computing node.

In particular, for a BRU 118, the micro base station side has some baseband processing functions, which is equivalent to the fact that the micro base station is connected to a co-sited micro computing node. The BRU 118 may execute a four part of communication processing of a cell corresponding to the BRU. In addition, as shown in FIG. 2, the centralized computing nodes 145 may be interconnected. In this case, the centralized computing nodes 145 may transfer, through task scheduling, a fifth part of communication processing to other centralized computing nodes for execution. The all communication processing further includes the fourth part of communication processing and/or the fifth part of communication processing.

In an embodiment, the fifth part of communication processing, the fourth part of communication processing, the third part of communication processing, the first part of communication processing, and the second part of communication processing may be performed at the same time. In another embodiment, the fifth part of communication processing, the fourth part of communication processing, the third part of communication processing, the first part of communication processing, and the second part of communication processing may be performed at different time, which is not limited in embodiments of the present invention.

The following describes the interface between each network element provided in this embodiment of the present invention. As shown in FIG. 2, the connections between a macro cell radio unit 116 and a local computing node 125-1/125-2, between a Pico cell RRU 117 and a local computing node 125-1/125-2, between a macro cell radio unit 116 and a centralized computing node 145-2, and between a Pico cell RRU 117 and a centralized computing node 145-2 are implemented through a class 1 interface C1. The class 1 interface C1 is configured to transmit baseband data and control state messages, for example, it provides synchronization and corresponding control management functions. The class 1 interface C1 may be implemented by using current protocols such as a Common Public Radio Interface (CPRI) between the BBU and the RRU of a distributed base station.

The connections between a Pico cell BRU 118 and the local computing node 125-1/125-2, between the local computing node 125-1 and the centralized computing node 145-1, between the local computing node 125-2 and the intermediate computing node 135, between the intermediate computing nodes 135 at the upper and lower layers, between the intermediate computing node 135 and the centralized computing node 145-1, between the centralized computing nodes 145-1 and 145-2, and between the Pico cell BRU 118 and the centralized computing node 145-2 are implemented through a class 2 interface C2. The class 2 interface C2 is configured to transmit baseband data, data packets, and control state messages, for example, to exchange computing tasks and control messages between computing nodes at the upper layer and the lower layer. The class 2 interface C2 may be implemented through the combination of the current interface protocols CPRI and the functions of X2, Iur, and Iub.

The centralized computing node 145-1/145-2 and a core network 200 may be connected through a class 3 interface C3. The class 3 interface C3 is configured to transmit data packets and control state messages. The class 3 interface C3 may be implemented through the functions of the existing S1 and Iu interfaces.

In the embodiment shown in FIG. 2, the amount of communication processing that needs to be processed by the centralized computing layer 140 may be further reduced through the intermediate computing layer 130, which reduces bandwidth requirements and improves the utilization of system resources.

The communication processing provided in this embodiment of the present invention refers to processing related to wireless network communication, and includes but is not limited to data processing, joint interference management processing, joint resource scheduling processing, joint computing task scheduling processing, joint processing or joint transmission of multi-standard baseband signals and upper layer protocols, and joint control of the working mode or on-off state.

The following describes the operations of each network element by referring to a three-layer network architecture that does not include an intermediate computing layer (145-1 to 125-1, and to 115-1 shown in FIG. 2) or a 4-layer network architecture that includes an intermediate computing layer (145-1 to 135, to 125-2, and to 115-2). However, this embodiment of the present invention may be similarly applied in a scenario that multiple intermediate computing layers are included, where each intermediate computing layer processes a part or all of the communication processing of a cell served by a radio transceiving node connected (or indirectly connected) to each intermediate computing layer.

Figure 3A:
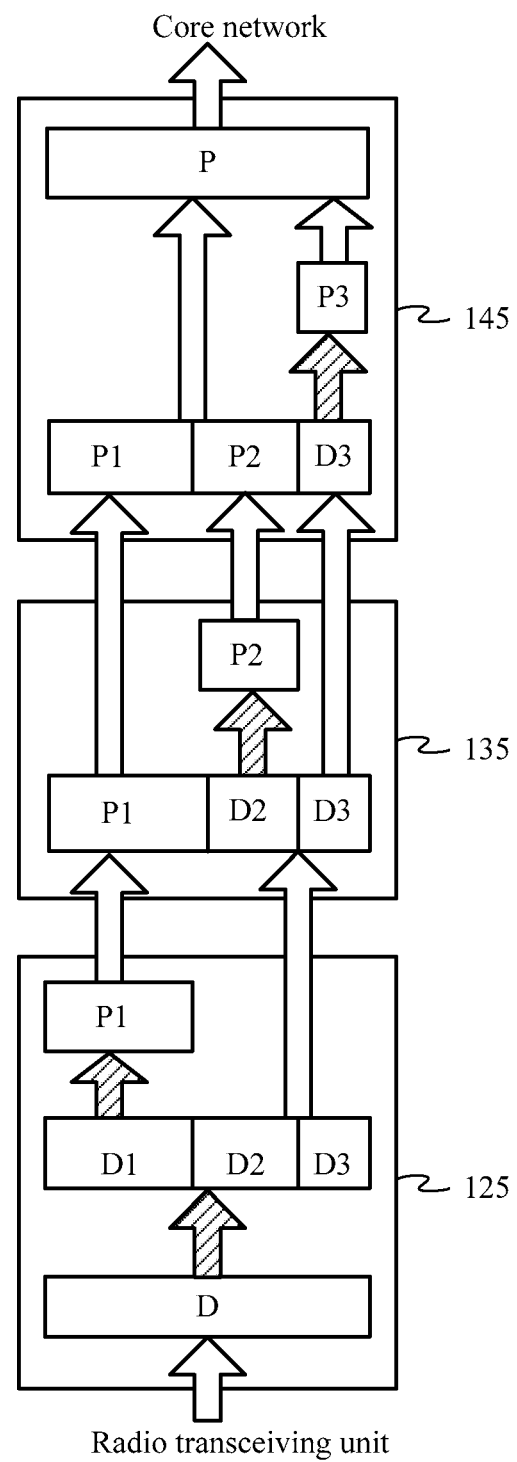
FIGS. 3A to 3B are a schematic diagram of a data processing procedure according to an embodiment of the present invention.
Figure 3B:
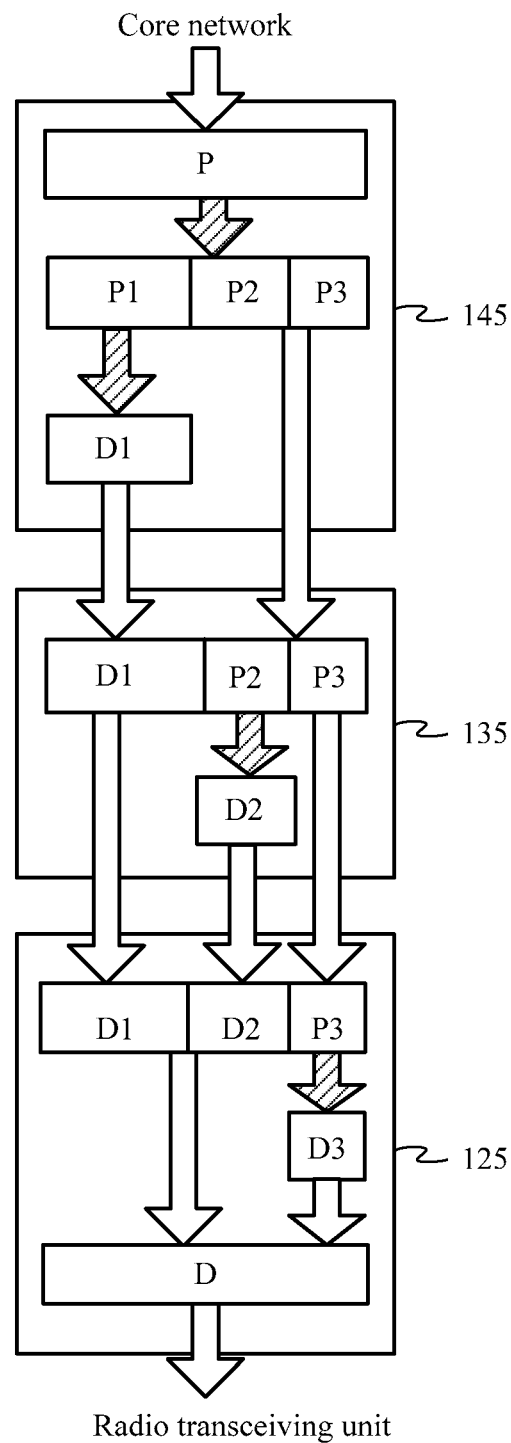

FIG. 3A to FIG. 3B are a schematic diagram of a data processing procedure according to an embodiment of the present invention. FIG. 3A is a schematic diagram of an example of uplink data processing. FIG. 3B is a schematic diagram of an example of downlink data processing. The communication processing includes, in the case of data processing, dividing received data by each computing node to differentiate data that needs to be processed by the local computing node and data that needs to be processed by non-local computing nodes. The data that needs to be processed by the non-local computing nodes may include data that is already processed by a previous layer computing node and/or data that needs to be processed by a next layer computing node. A computing node (the centralized computing node 145) at the top layer of the network architecture and a computing node at the bottom layer (a local computing node 125) need to aggregate data that has undergone the communication processing.

Specifically, as shown in FIG. 3A, in the uplink, the local computing node 125 divides data D sent from radio transceiving nodes. In the embodiment shown in FIG. 3A, it is assumed that no BRU exists, that is, data D is baseband data and control messages that are not processed. The local computing node 125 divides the data D into D1 processed by the local computing node 125, D2 processed by the intermediate computing layer 130 (it is assumed that an intermediate computing layer exists), and D3 processed by the centralized computing layer 140 (D=D1+D2+D3). Then, the baseband and/or L2 processing on the data D1 that needs to be performed by the local computing node 125 is completed, and a data packet P1 generated after the D1 is processed and data D2+D3 that needs to be processed by the intermediate computing layer 130 and a top computing layer 140 (that is a centralized computing layer 140) are transmitted to the intermediate computing node 125 in the intermediate computing layer 130 connected to the local computing node 125 (or the centralized computing node 145 in the centralized computing layer 140 connected to the local computing node 125 if no intermediate computing layer exists). The local computing layer is the main functional node for reducing the transmission bandwidth. In another respect, if a BRU exists, the operations performed by the local computing node 125 may be similar to the following operations performed by the intermediate computing node 135.

The intermediate computing node 135 of the intermediate computing layer 130 divides data sent from a lower layer node (the local computing node 125 or a lower layer intermediate computing node) in the uplink, and differentiates data D2 that needs to be performed at the intermediate computing layer 130 and data P1 and D3 that does not need to be performed at the intermediate computing layer 130. The intermediate computing node 135 performs baseband and/or L2 processing on the data D2, and transmits the processing result P2 (data packet) of the intermediate computing layer, data D3 that needs to be processed by the upper layer computing layer and data P1 that is already generated by the computing node 125 to the upper layer intermediate computing node (if no upper layer intermediate computing node exists) or the centralized computing node 145 (if no upper layer intermediate computing node exists).

The centralized computing layer 140 is a computing layer directly connected to the core network. In the uplink, the centralized computing nodes 145 of the centralized computing layer 140 divides the data to be computed, and differentiates the data D3 that needs to be processed by the centralized computing nodes 145 and data (for example, data packets P1 and P2 generated after the lower layer computing node completes the data processing) that does not need to be processed by the centralized computing nodes 145. Then, the centralized computing nodes 145 perform joint processing and L2 processing on the baseband data D3 uncompleted by the lower layer, aggregates the processing result P3 (a data packet) and data packets P1 and P2 generated after the lower layer completes the processing into a data packet P, and transmits the data packet P to the core network.

Similarly, in the downlink, the centralized computing nodes 145 divide the data packet P sent from the core network into P3 that needs to be processed at the local computing layer, P2 that needs to be processed at the intermediate computing layer (if the intermediate computing layer exists), and P1 that needs to be processed on the centralized computing nodes 145, where P=P1+P2+P3. The L2 processing and baseband processing are performed on the data packet P1 that needs to be processed, and the processing result D1 (baseband signal and control message) and data packets P2 and P3 that need to be processed at the intermediate computing layer and the local computing layer are transmitted to the intermediate computing layer (if the intermediate computing layer exists) or the local computing layer (if no intermediate computing layer exists).

The intermediate computing node 135 divides the data sent from an upper layer node (the centralized computing node 145 or an upper layer intermediate computing node), and differentiates the data P2 that needs to be processed at the intermediate computing layer and the data D1 and P3 that do not need to be processed at the intermediate computing layer. The intermediate computing node 135 performs L2 and baseband processing on the data P2, and transmits the processing result D2 (baseband signal and control message), the data P3 that needs to be processed by the lower layer computing node, and the data D1 generated after the centralized computing nodes 145 complete the processing to the lower layer intermediate computing node (if the lower layer intermediate computing node exists) or the local computing node 125 (if no lower layer intermediate computing node exists).

The local computing node 125 divides the data sent from the upper layer computing node, and differentiates the data packet P3 that needs to be processed by the local computing node 125 and data (for example, baseband signal and control messages D1 and D2 generated after the upper layer computing node already completes the processing) that does not need to be processed by the local computing node 125. Then, the local computing node 125 completes the processing of the data packet P3 that is not completed by the upper layer, aggregates the processing result D3 (baseband signal and control message) and the baseband signal and control messages D1 and D2 sent from the upper layer into a baseband signal and control message D, and transmits D to a radio transceiving node.

When a computing node divides data, the computing node can determine a data division ratio according to such factors as the computing capability of the computing node, inter-node bandwidth, and data processing requirements (processing speed requirement, delay requirement, and processing volume requirement). In the embodiment shown in FIG. 3A, the local computing node 125 may directly divides the data D1 that needs to be processed at the local computing layer, the data D2 that needs to be processed by the intermediate computing node 135, and the data D3 that needs to be processed by the centralized computing node 145, which is not limited in this embodiment of the present invention. The local computing node 125 may not differentiate D2 and D3, but divides only the data D1 that needs to be processed at the local computing layer and D2+D3 that do not need to be processed at the local computing layer. Then, the intermediate computing node 135 differentiates D2 and D3 according to the actual requirement. Similarly, in the embodiment shown in FIG. 3B, the centralized computing nodes 145 may not differentiate P2 and P3.

In the embodiments shown in FIG. 3A and FIG. 3B, except the last layer computing node, computing nodes of other layers do not aggregate the data, but transmit various data separately, for example, data generated after the local layer performs processing, data already processed by the previous layer, and data that needs to be processed by a next layer. The data is not limited in this embodiment of the present invention. When data is transmitted to an upper layer computing node or a lower layer computing node, the data may be aggregated before being transmitted.

The communication processing that can be executed by the layered network architecture provided in this embodiment of the present invention may include joint interference management processing. For example, for a user equipment at the border between cells, if joint processing can be performed between neighboring cells, the throughput of the user equipment can be greatly increased. In this embodiment of the present invention, a layered adaptive manner may be adopted in the joint interference management processing. The basic principle for the joint interference management processing is that interference is preferably processed by an upper layer computing node shared by both the interfering parties.

The following describes the joint interference management processing provided in this embodiment of the present invention with reference to the system architecture shown in FIG. 2. The local computing node 125 preferably executes the communication processing of a user equipment without visible interference in a cell corresponding to the radio transceiving nodes 116-118 in the radio transceiving node combination 115 connected to the local computing node 125 or the interference processing of a user equipment that suffers only the interference (for example, interference of the other radio transceiving nodes 116-118 or interference of a UE served by the other radio transceiving nodes 116-118) of a cell corresponding to other radio transceiving nodes 116-118 in the radio transceiving node combination 115 connected to the local computing node 125. For example, the local computing node 125-1 preferably executes the communication processing of a user equipment without visible interference in a cell corresponding to the radio transceiving node combination 115-1 or the interference processing of a user equipment that suffers only interference of a cell corresponding to the radio transceiving nodes 116-118 in the radio transceiving node combination 115-1.

The intermediate computing node 135 preferably executes the interference processing of a user equipment in a cell corresponding to a radio transceiving node in a radio transceiving node combination connected to a lower layer intermediate computing node or a local computing node connected to the intermediate computing node 135, where the user equipment suffers interference of a cell corresponding to a radio transceiving node in a radio transceiving node combination connected to other lower layer intermediate computing nodes or a local computing node connected to the intermediate computing node. For example, if an intermediate computing node 135 is connected to multiple local computing nodes, the intermediate computing node 135 preferably processes the interference between multiple local computing nodes.

The centralized computing node 145 preferably executes the interference processing of a user equipment in a cell corresponding to a radio transceiving node in a radio transceiving node combination connected to a lower layer intermediate computing node or a local computing node connected to the centralized computing node 145, where the user equipment suffers interference of a cell corresponding to a radio transceiving node in a radio transceiving node combination connected to other lower layer intermediate computing nodes or a local computing node connected to the centralized computing node. Taking the architecture shown in FIG. 2 as an example, if a user equipment A served by the radio transceiving node 116 connected to the local computing node 125-1 suffers interference of the radio transceiving node 118 connected to the local computing node 125-2, an upper layer computing node (that is, the centralized computing node 145-1) shared by them executes the processing of the interference.

The interference processing performed by the local computing node, the intermediate computing node, and the centralized computing node may include joint interference cancellation, joint time-frequency resource coordination, joint power control, and coordinated multi-point (CoMP) between multiple base stations.

In this way, most of user signals may undergo joint processing on the local computing node, which greatly reduces the volume of data transmitted to the upper layer computing node, thus saving fiber resources and reducing the load of the upper layer computing node.

Figure 4:
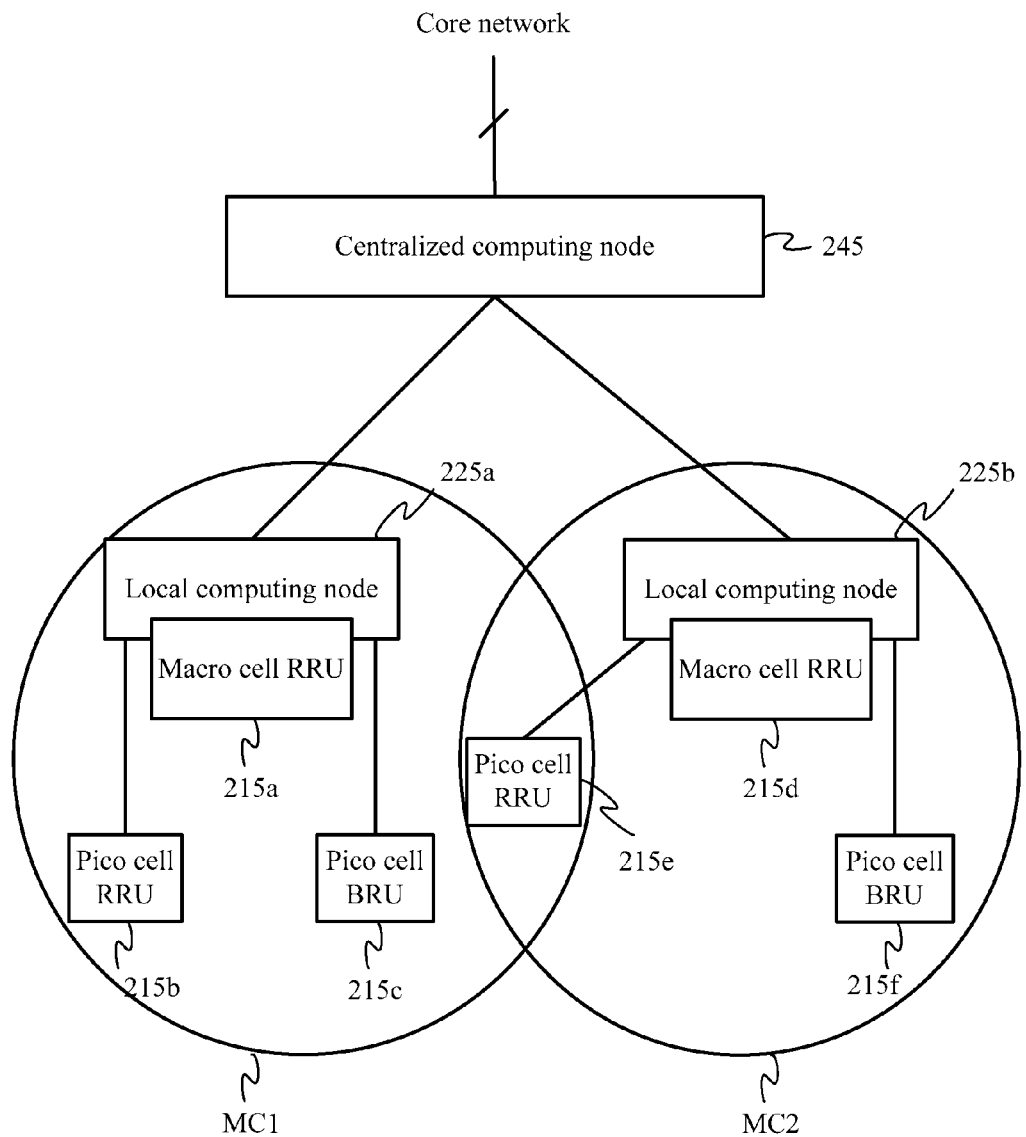
FIG. 4 is a schematic diagram of a typical example of a HetNet network architecture according to an embodiment of the present invention.

FIG. 4 is a schematic diagram of a typical example of a HetNet network architecture according to an embodiment of the present invention. As shown in FIG. 4, the HetNet network architecture includes a centralized computing node 245 and two local computing nodes 225a and 225b. In the HetNet network architecture, a local computing node is typically set at a macro base station, for example, it is co-sited with a macro cell RRU. The local computing node may also be set in an area formed by multiple neighboring macro base stations, for example, it is connected to multiple macro cell RRUs. The communication processing performed by the local computing node includes: (1) dividing the communication processing into "computing task packets" of different loads flexibly according to users, uplink/downlink, and macro/Pico, so that the system performs adaptive allocation of processing loads between the centralized computing node and the local computing node according to the actual need; (2) performing baseband signal processing tasks that are suitable for being completed on the local computing node: all baseband processing of user signals of the local Macro/Pico, not interfering with other Macro/Pico; (3) performing pre-processing of local Macro/Pico baseband signals (for example, FFT, Mapping/De-mapping, and Precoding) or signal compression processing; (4) implementing unified processing and joint transmission of multiple systems of different standards through software defined radio (SDR).

Specifically, in the example shown in FIG. 4, a local computing node 225a is connected to a radio transceiving node combination formed by a macro cell RRU 215a, a Pico cell RRU 215b, and a Pico cell BRU 215c, where the local computing node 225a is co-sited with the macro cell RRU 215a, and the Pico cell RRU 215b and the Pico cell BRU 215c are within the coverage of MC1 of the macro cell RRU 215a.

The local computing node 225b is connected to a radio transceiving node combination formed by a macro cell RRU 215d, a Pico cell RRU 215e, and a Pico cell BRU 215f, where the local computing node 225b is co-sited with the macro cell RRU 215d, and the Pico cell RRU 215e and the Pico cell BRU 215f are within the coverage of MC2 of the macro cell RRU 215d.

Within a larger area formed by multiple macro cells, the local computing node 225a/225b in each macro cell is connected to a centralized computing node 245. In this way, an upper layer cloud computing architecture is formed within a larger area.

FIG. 4 illustrates only two macro cells MC1 and MC2, which are not limited in this embodiment of the present invention. A centralized computing node may be connected to multiple local computing nodes, and each local computing node may also be connected to more macro cell RRUs. Each macro cell may not have Pico cell RRUs or Pico cell BRUs, and the number of Pico cell RRUs/BRUs may be increased or decreased according to the actual need. All these modifications should fall within the scope of the present invention.

In the following descriptions, in the case that differentiation is unnecessary, the local computing nodes 225a and 225b are collectively called the local computing node 225, and the macro cell RRU 215a, the Pico cell RRU 215b, the Pico cell BRU 215c, the macro cell RRU 215d, the Pico cell RRU 215e, and the Pico cell BRU 215f are collectively called the radio transceiving node 215.

For example, in FIG. 4, each radio transceiving node is first connected to the local computing nodes 225, and then connected to the upper layer centralized computing node 245 through the local computing nodes 225, but there is no interface between the local computing nodes 225, and no connection exists between radio transceiving nodes. Because the X2 interface standardization does not consider the coordinated multi-point (CoMP), the bandwidth and delay of the X2 interface cannot meet the coordinated multi-point and joint processing requirements. In this embodiment of the present invention, there is no logical interface between the base stations, and the coordinated multi-point and joint processing are performed by the upper layer computing node. In addition, the RNC is cancelled in this embodiment of the present invention, and the data processing and joint scheduling performed by the RNC in the UMTS system are performed on the upper layer computing node.

Furthermore, because the HetNet network is a unified RAN, the processing on all the computing nodes is implemented through software. Different virtual machines or different processes on the unified operating system platform perform processing of different radio standards, implement G/U/L/WiFi (that is GSM/UMTS/LTE/WiFi), and support joint transmission of multiple systems of different standards.

It should be noted that the HetNet architecture shown in FIG. 4 is exemplary only, and is not limited in this embodiment of the present invention. The number of computing nodes, the location of the computing nodes, and the number of layers of the computing nodes may be modified according to the actual need, or one or multiple layers of computing nodes may be added. In addition, the HetNet architecture shown in FIG. 4 may be used in combination with the continuous coverage of the Pico cell, that is, some local computing nodes 225 may be connected to multiple Pico cell BRUs/RRUs in the continuous coverage within a smaller area. All these modifications fall within the scope of the present invention.

In the HetNet scenario shown in FIG. 4, the interference the user equipment suffers may be divided into the following types:

1) User equipment (UE) without visible interference:

UE without visible interference in a macro cell MC1/MC2: Typically, this type of UE is located at the central area of a local macro cell. Because this type of UE is far away from neighboring macro cells, this type of UE suffers very small interference from the neighboring macro cells. In addition, because this type of UE is far away from hot areas using a same frequency band in the local macro cell, this type of UE suffers very small interference from the Pico cell.

UE without visible interference in the Pico cell: Typically, this type of UE is located at the central location in an isolated hot area. Because this type of UE is located in an isolated hot area, the UE suffers small interference from other Pico cells in the local macro cell. Because this type of UE is located at the central location of the Pico cell, the UE also suffers relatively small interference from the macro cell.

For the UE without visible interference, the data of the UE is preferably processed on the local computing node connected to the UE if the tidal effect is not considered. This is because even if joint processing is performed, generated gains are not visible, and loads of baseband signal transmission may be obviously increased. For the cloud-RAN architecture provided in this embodiment of the present invention, the communication processing of this type of user data is preferably performed on the local computing node.

For user equipments with visible interference, the following two cases are divided according to the interference source: data is preferably processed on the local computing node 225 and data is preferably processed on the centralized computing node 245.

2) Interfered user preferably processed on the local computing node 225

For the case that data is preferably processed on the local computing node 225:

Type 1: Micro-cell UE that suffers only interference of the macro cell. This type of UE is located at the edge of the Pico cell, but there are not other Pico cells around this type of UE. Therefore, the signals of the UE suffer only interference from the Pico cell signals. The joint processing of interference needs to be performed between only the Pico cell and the macro cell. For example, if the UE served by the Pico cell RRU 215b suffers only interference from the macro cell MC1, the interference of the UE is processed by the local computing node 225a.

Type 2: Macro cell UE located at the edge of the Pico cell, whose interference source comes from neighboring Pico cells. The joint processing of interference needs to be performed between only the macro cell and the Pico cell generating larger interference. For example, if the UE served by the macro cell RRU 215a suffers only interference from the Pico cell RRU 125b, the interference of the UE is processed by the local computing node 225a.

Type 3: If two Pico cells are very close, a user located at the border between these two Pico cells may always suffer interference from another two cells, no matter whether the user belongs to the macro cell or one of the two Pico cells. There are three examples: The UE served by the macro cell MC1 suffers interference from two neighboring Pico cells (that is, interference from the Pico cell RRU 215b and the Pico cell BRU 215c); the UE served by the Pico cell RRU 215b suffers interference from the macro cell RRU 215a and the Pico cell BRU 215c; the UE served by the Pico cell BRU 215c suffers interference from the macro cell RRU 215a and the Pico cell RRU 215b. The joint processing of interference needs to be performed between only the macro cell and the two neighboring Pico cells. For example, in the above three examples, the interference is processed by the local computing node 225a.

For users that preferably undergo joint interference processing on the local computing node, their data is preferably processed by the local computing node in the cloud-RAN architecture associated with the users if the tidal effect is not considered. Because their interference sources exist between cells of the local computing node, the joint processing may be performed on only the local computing node. In this case, even if the joint interference processing is performed on the centralized computing node, further performance gains may not be brought about, while the loads of the baseband signal transmission may be obviously increased.

3) Data of interfered user preferably processed on the centralized computing node 245

For interference that is preferably processed on the centralized computing node 245:

Type 4: UE served by a macro cell (for example, one of MC1 and MC2) located at the edge of several macro cells (for example, MC1 and MC2). When there is no Pico cell around the UE, the interference source of the UE mainly comes from a neighboring macro base station (MC2 or MC1). For users located in non-hot areas of the macro cell, their signals suffer interference from the neighboring macro cells. Because the local computing node is located in the local macro cell, the local computing node cannot perform joint interference processing on users in several macro cells around the users. Therefore, this type of UE sends data to the centralized computing node 245. Because the centralized computing node 245 is responsible for macro cells and Pico cells within a larger area, it can perform joint interference processing on signals of several different macro cell users. For example, if the UE served the MC1 suffers interference form the macro base station of the MC2, the centralized computing node 245 processes the interference.

Type 5: If a hot area is located at the border between several macro cells, no matter whether users at the edge of the Pico cell belong to the Pico cell or a macro cell, the users suffer interference from other cells. For example, a UE served by the Pico cell RRU 215e suffers interference from the macro base stations of the neighboring macro cells MC1 and MC2; a UE served by the macro cell MC1 suffers interference from the macro base stations of the Pico cell BRU 215c and the macro cell MC2; users of the macro cell MC2 suffer interference from the macro base stations of the Pico cell RRU 215e and the macro cell MC1. Because the bottom layer computing node is located in the local macro cell, the local cloud-RAN architecture cannot perform joint interference processing on users in several macro cells around the users. Therefore, same as Type 4, this type of UE sends data to the upper layer centralized computing node 245. Because the upper layer cloud-RAN architecture is responsible for macro cells and Pico cells within a larger area, it can perform joint interference processing on signals of different macro cell and Pico cell users.

For users that preferably undergo joint interference processing on the centralized computing node 245, their data is preferably processed on the upper layer computing node in the cloud-RAN architecture. Because their interference sources are located between macro cells and Pico cells in several local cloud-RAN architectures, joint processing is expected to be performed on the centralized computing node 245 to improve the system performance. Because there are only few users at the border between several bottom layer cloud-RAN architectures, data transmitted to the upper layer cloud-RAN architecture for joint processing is limited, which does not impose too heavy loads on the baseband signal transport network.

To determine whether the upper layer joint processing needs to be performed, the network side may ask the UE to periodically measure the reference signal strength and receive the delay of the RRU/BRU nearby. If the network side finds that multiple RRUs/BRUs have similar strength and delay, it transfers the user data to an upper layer computing node shared by these RRUs/BRUs. On the contrary, if the network side finds that there are relatively huge differences between the reference signal strength of neighboring RRUs/BRUs measured by the UE processed by an upper layer computing node, for example, when the strength of only one or several RRUs/BRUs is larger, the network side transfers the signal of the UE to the lower layer computing nodes corresponding to these RRUs/BRUs.

Taking the LTE as an example, in the uplink, when the bottom layer computing node (a micro computing node or a local computing node) receives data output by the radio unit, it performs FFT on the data and divides the data into resource blocks (RBs, Resource Blocks) processed by a micro computing node (if the BRU exists), a local computing node, and a centralized computing node. The computing nodes at each layer process corresponding baseband data, and transmit transparently the baseband data processed by the upper layer to the upper layer computing node.

In the downlink, the centralized computing node divides data packets from the core network into parts processed by the centralized computing node, the local computing node, and the micro computing node (if the BRU exists). The baseband data and control messages processed at each layer are combined on the bottom layer computing node (the local computing node or the micro computing node), and processed by the radio unit into transmit signals.

For a CDMA (Code Division Multiple Access, code division multiple access) access manner, data of different users is loaded into an orthogonal code sequence. The method of layered processing may be similar to the method of differentiating users by time-frequency resource blocks, and is not further described.

The communication processing executed by the communication system provided in this embodiment of the present invention may include joint resource scheduling processing. By scheduling resources between neighboring cells, the communication system reduces interference between cells, and improves the resource utilization and system performance. In the multilayer cloud-RAN architecture provided in this embodiment of the present invention, resource management is performed on different layers of networks according to different user locations, and the computing nodes at each layer are responsible for scheduling resources in different cases. The principle for joint resource scheduling processing is that the local computing node, the intermediate computing node, or the centralized computing node connected to the radio transceiving nodes serving the user equipment perform resource scheduling on the user equipment.

As shown in FIG. 2, the local computing node 125 executes resource scheduling between cells corresponding to radio transceiving nodes 116-118 in a radio transceiving node combination 115 connected (directly connected) to the local computing node 125. The intermediate computing node 135 executes resource scheduling between cells corresponding to radio transceiving nodes 116-118 in the radio transceiving node combination 115 connected (indirectly connected) to the intermediate computing node 135. The centralized computing node 145 executes resource scheduling between cells corresponding to radio transceiving nodes 116-118 in the radio transceiving node combination 115 connected (directly or indirectly connected) to the centralized computing node 145.

In a heterogeneous network HetNet scenario shown in FIG. 4, the local computing node 225 performs local Macro-Pico joint resource scheduling. For central users in the macro cell and users in the Pico cell within the macro cell, interference with other macro cells is very small, so that completely localized scheduling and control can be performed on resources, and only the local Macro-Pico joint resource scheduling needs to be performed. Because the Macro-Pico joint scheduling may be used, the traffic channel resources of the Pico cell may be reused in the macro cell. For different Pico cells far from each other, the interference between them is very small, and the control and traffic channel resources may be scheduled independently. For example, the local computing node 225*a* may perform Macro-Pico joint resource scheduling in the coverage of the MC1, and the local computing node 225*b* may perform Macro-Pico joint resource scheduling in the coverage of the MC2.

The centralized computing node 245 performs global Macro-Pico joint resource scheduling. The UEs at the edge of a macro cell and UEs in the Pico cell at the edge of the macro cell have mutual interference with other macro cells. Therefore, for such UEs, global resource scheduling needs to be performed. For example, as shown in FIG. 4, assuming the Pico cell RRU 215*e* is located at the border between the coverage of the macro cell MC1 and the coverage of the MC2, the resource allocation in the Pico cell RRU 215*e* may be scheduled by the centralized computing node 245 to reduce inter-cell interference.

The following is based on the fact that the inter-cell interference is reduced through joint scheduling of frequency domain resources. In the bottom layer cloud architecture, the local computing node performs resource allocation at the border between the Pico cell in the macro cell and the macro cell. At the border between two neighboring Pico cells, the frequency domain resources are divided into f1, f2, and f3, which are used respectively by the edge UEs of the two Pico cells and macro cell at the border. The specific ratio of each frequency domain resource is determined by the number of users and data traffic at the edge of each cell.

In the upper layer cloud architecture, the centralized computing node 245 performs resource allocation between multiple bottom layer cloud architectures. For example, in the HetNet cloud computing architecture shown in FIG. 4, the centralized computing node 245 is responsible for allocating frequency domain resources of the edge UEs at the border between two macro cells MC1 and the MC2 and a Pico cell (for example, the cell covered by the Pico cell RRU 215*e*) near the border between the macro cells. For example, frequency domain resources are divided into f1, f2, and f3, which are used respectively by the edge UEs of two macro cells and one Pico cell. The specific ratio of each frequency domain resource is determined by the number of users and data traffic at the edge of each cell.

Assuming that the macro cell and Pico cell use a same frequency domain resource in a heterogeneous network, upper layer and lower layer computing nodes may schedule a same time-frequency resource. To avoid scheduling conflicts, the following two solutions may be used:

(1) Resources scheduled by the local computing node, the intermediate computing node, and the centralized computing node are configured differently. This is multilayer scheduling based on frequency division/time division/space division, without changing the current standard data processing procedure.

Specifically, the upper layer computing node performs joint scheduling on a certain time/frequency/space domain resources on UEs that need to undergo joint processing in the lower layer coverage. The lower layer computing node performs scheduling on other related and remaining time/frequency/space domain resources of the upper layer. That is, The lower layer computing node performs scheduling on remaining (other) time/frequency/space resources of the upper layer (scheduling). To ensure the throughput of the local UE, resources at the upper layer for upper layer joint scheduling must be limited within a certain range, and be dynamically adjusted according to the actual UE distribution and data volume.

(2) The upper layer computing node executes resource scheduling preferably. This scheduling is executed by the upper layer, and can optimize the throughput of the entire network.

The channel information of all user equipments, for example, uplink sounding reference signal SRS (Sounding Reference Signal), CQI (Channel Quality Indicator)/PMI (Precoding Matrix Indicator)/RI (Rank Indicator), is transmitted to the computing node at an upper layer. Because user data passes through the computing node at an upper layer, the computing node at an upper layer has the current and previous information of the user data rate when performing unified scheduling to ensure the fairness of the scheduling. If the computing node at an upper layer has a powerful computing capability, it is acceptable to unify the computing loads of the upper layer user scheduling.

In a conventional C-RAN architecture, because the BBU is far away from the RRU, the BBU needs to be connected to the RRU through high-speed fibers, which requires high baseband transmission costs.

In the architecture provided in this embodiment of the present invention, the local computing node is very close to the local macro cell RRU and the Pico cell RRU/BRU. For example, if the macro cell where the distance between sites is 500 meters as an example, the distance between the local computing node and the remote Pico cell RRU is about 200 meters. In this way, a lot of other short-distance connection media and technologies may be used as connections between different nodes provided in this embodiment of the present invention. For example, the connection between the radio transceiving node in a radio transceiving node combination and the local computing node, the connection between the local computing node and the intermediate computing node, or connection between intermediate computing nodes at the upper layer and the lower layer is established through a fiber, a DSL (Digital Subscriber Line), a microwave link, or an electrical power cable. Therefore, the layered structure greatly simplifies the topology of the baseband signal transport network, and effectively reduces the transmission cost. The connection medium between nodes may be determined according to such factors as the computing capability of the node, inter-node distance, inter-node transmission bandwidth requirement, and/or inter-node transmission delay requirements.

For example, such technologies as digital subscriber line DSL (twisted pair or copper wire), microwave link, and electrical power cable may implement a transmission rate close to one Gbps within the range of 200 meters, and can be used to replace the fiber for transmitting local short-distance signals.

For the connection between the local computing node and the centralized computing node, a fiber can be used because the number of such nodes is small and the distance therebetween is long.

According to the actual scenario, different physical media may be used on baseband signal transport networks in each layer of the cloud RAN according to the transmission distance and cost.

In respect of the transmission bandwidth, the network architecture provided in this embodiment of the present invention may allocate computing loads according to the bandwidth adaptability of the baseband signal transport network. When the available transmission bandwidth is larger, the processing loads may be transferred to the upper layer computing node, which simplifies the configurations of the local computing node. When the available transmission bandwidth is smaller, most of the processing loads may be allocated to the local computing node.

The communication processing executed by the communication system provided in this embodiment of the present invention may include joint computing task scheduling processing. The network architecture provided in this embodiment of the present invention is capable of balancing computing loads within a larger area and effectively utilizing computing resources.

A computing task is mutually transferred, according to computing loads, computing capabilities, transmission bandwidth, and transmission delays, between the local computing node and the intermediate computing node connected to the local computing node, between intermediate computing nodes connected at the upper layer and the lower layer, between the intermediate computing node and the centralized computing node connected to the intermediate computing node, and between interconnected centralized computing nodes.

The baseband data corresponding to the RRU in the local macro cell is preferably processed on the local computing node. If the computing load of the local computing node is too heavy due to the limited processing capability of the local computing node or the tidal effect of the user equipment, the local computing node may transfer some signals to an upper layer computing node (for example, the intermediate computing node or the centralized computing node) for processing. The upper layer computing node is responsible for balancing the computing loads of the local computing node within a larger area. When the computing load of the upper layer computing node is too heavy, the upper layer computing node may transfer some of computing tasks to the local computing node for processing.

Generally, for a multilayer cloud-RAN, because computing tasks are distributed on different computing nodes at more than two layers, the scheduling of computing tasks may be performed on the upper layer computing node in a centralized manner or performed on the computing nodes at each layer in a distributed manner.

If the computing tasks are scheduled in a centralized manner, the upper layer computing node schedules the transfer of computing tasks. For example, in the HetNet scenario shown in FIG. 4, each local computing node 225 may periodically report current computing loads to the upper layer centralized computing node 245. After the centralized computing node 245 collects the information of each local computing node 225, it determines whether to transfer some computing tasks of some local computing nodes to the centralized computing node. Then, the centralized computing node 245 returns a scheduling command to each local computing node 225 to indicate whether some computing tasks need to be transferred and the computing load to be transferred.

If the computing tasks are scheduled in a distributed manner, the computing node schedules the transfer of computing tasks according to the requests of other computing nodes. In this case, the local computing node 225 has equal rights as the centralized computing node 245. When the computing resources of the local computing node 225 are insufficient, the local computing node 225 sends a request for transferring computing tasks to the centralized computing node 245, where the request includes the transferred computing load. After the centralized computing node 245 receives the request reported by each local computing node 225, it gives feedback, according to the idle state of its computing resources in combination with the requests of each subordinate local computing node 225, to the request sent from each local computing node 225 for transferring computing resources. The feedback message includes whether the computing tasks are permitted to be transferred and the computing load to be transferred. In another respect, when the resources of the centralized computing node 245 are insufficient, the centralized computing node 245 sends a request for transferring computing tasks (for example, a transfer request about the fifth part of communication processing) to the lower layer local computing node 225 through polling or random selection or sends a request for transferring computing tasks to other centralized computing nodes, where the two request messages include the computing load to be transferred. The local computing node 225 or the centralized computing node 245 that receives the request returns, according to the idle state of its computing resources, a scheduling command to the centralized computing node 245 sending the request, to indicate whether some computing tasks need to be transferred and the computing load to be transferred.

If the communication system supports multiple standards, the radio transceiving node combination may include radio transceiving nodes supporting multiple standards. In this case, the communication processing executed by each computing node in this embodiment of the present invention may include processing of communication systems of different standards and/or joint processing of multiple communication systems of different standards.

The radio frequency part, up/down conversion, filtering, and baseband processing of the conventional analog radio system adopt the analog manner. Each communication system with different frequency bands and modulation manners has its special hardware structure. However, the low frequency part of the digital radio system adopts a digital circuit, but the radio frequency part and the intermediate frequency part still depend on the analog circuit. As compared with the conventional radio system, the A/D and D/A converters of the software defined radio are moved to the intermediate frequency and located close to the radio end as much as possible, and samples the entire system, which is an outstanding feature of the software defined radio. The digital radio adopts a special digital circuit to implement a single communication function, without programmability. However, the software defined radio uses a DSP (Digital Signal Processing) part with powerful programmability to replace the special digital circuit, so that the hardware structure of the system is relatively independent of the function of the system. In this way, based on a relatively universal hardware platform, the software defined radio system implements different communication functions through software, and performs programming control over the operating frequency, system bandwidth, modulation manner, and source coding, thus greatly improving the system flexibility.

In this embodiment of the present invention, because each computing node is formed by a high-performance CPU or CPU array and DSP, a same computing node may support RRUs of different standards for baseband signal and upper layer protocol processing. This brings about a series of benefits: Different standards are used in a same processing unit, which simplifies the network architecture and reduces network construction costs; the upgrade of the system or base station is easily completed by updating the software of computing nodes, which facilitates the refarming (refarming) of existing spectrum resources.

If the user equipment supports concurrent transmission of multiple systems of different standards, the local computing node offloads, according to the actual situation (radio link conditions and network loads) in different systems, the data to different systems for transmission. In the uplink transmission, the local computing node or the intermediate computing node or the centralized computing node aggregates the data in different systems. If the user equipment supports multiple-manner transmission, the SDR-based and centralized processing manner certainly supports joint transmission of multiple systems of different standards. These standards may be G/U/L/WiFi, and the joint transmission of multiple systems of different standards can be performed at different protocol layers, for example, the PHY (physical layer), MAC (Media Access Control), and RLC (Radio Link Control). In addition, the computing node may perform unified scheduling on the joint transmission of multiple systems of different standards.

In the layered HetNet architecture shown in FIG. 4, the baseband signal processing of the local micro base station and macro base station is performed on the local computing node 225 in a centralized manner. In this scenario, network configurations may be performed adaptively between the micro base station and the macro base station. Compared with the conventional HetNet, the HetNet provided in this embodiment has a more flexible RAN architecture.

The communication processing provided in this embodiment of the present invention includes joint control over the working mode or on-off state of the Pico cell RRU and/or Pico cell BRU in a radio transceiving node combination. For example, a Pico cell may be configured in the following three forms flexibly and adaptively: (1) an independent Pico cell with its own Cell ID (cell identifier) and all control/data channels; (2) Relay Station (RN) of the macro base station; for a common in-band transmission manner, the RN is connected to the RAN through a donor eNodeB in wireless manner, and the used frequency band is the same as that of the link between the RN and the terminal; (3) distributed antenna of the macro base station, which sends/receives some or all radio signals of the macro base station in an SFN (Single Frequency Network) manner or other space coding manners (for example, SFBC (Space-Frequency Block Codes).

The number/mode of the Pico cell RRUs or BRUs may be configured adaptively according to different scenarios. For example, the Pico cell RRUs or BRUs may be configured to the foregoing three different working modes adaptively.

For example, when the traffic of a hot area varies greatly over the time, for example, the number of users is large in the daytime, while the number of users is small at night, the Pico cell RRU or BRU may be turned on when the number of users is larger, while the Pico cell RRU or BRU may be turned off when the number of users is smaller. The Pico cell RRU or BRU may be turned on or off adaptively according to the available bandwidth or load of transmission resources.

When the available transmission bandwidth between the local computing node 225 and the centralized computing node 245 is smaller, a Pico cell RRU or BRU may be added.

In this way, more users are served by the Pico cell RRU or BRU. Because the transmit power is reduced, interference from other macro base stations and interference on other macro base stations are greatly reduced as compared with the direct transmission between the UE and the macro base station. Therefore, it is unnecessary to perform joint processing on the centralized computing node, which effectively reduces the transmission bandwidth requirements between the local computing node 225 and the centralized computing node 245.

The communication system provided in this embodiment of the present invention performs layered and localized processing on the computing resources of the BBU, so that the radio transceiving nodes within a small area are managed on the local computing node in a centralized manner, while the radio transceiving nodes within a larger area are managed on the upper layer computing node in a centralized manner. A radio transceiving node is directly connected to the local computing node and indirectly connected to upper layer computing nodes within a large area through the local computing node. In addition, some radio transceiving nodes are also connected to the upper layer computing nodes. In this embodiment of the present invention, computing resources and joint processing may be scheduled between the local computing node and the centralized computing node adaptively according to the user distribution, data volume, and interference.

For the HetNet system, the local computing layer may be placed in a partially smaller area, for example, a macro cell, to reduce the requirement for bandwidth of the transport network through the partially local computing processing. In addition, multiple short-distance transmission technologies may be used locally. In this case, different ratios of data to be processed through cloud computing may be selected according to the bandwidth of the actual connection medium. The upper layer centralized computing layer is responsible for managing radio transceiving nodes and computing nodes within a larger area, so that the tidal effect of the user is solved by scheduling computing resources. Whether the intermediate computing layer is used as the transition from the local computing layer to the centralized computing layer is determined according to the actual networking.

Compared with the conventional C-RAN architecture, this embodiment of the present invention has the following advantage: Bandwidth for the connection between the base station and the cloud computing node is greatly saved. In future communication networks, the number of Pico cells is several times the number of current macro cells; the frequency band becomes increasingly wider; and the number of antennas is increased dramatically from four to several dozens and even over one hundred. If the conventional cloud-RAN architecture is still used, it is a big challenge for fiber transmission to connect all baseband data to the cloud computing center several kilometers away.

For example, in the downlink, assume that in an LTE system, each macro base station corresponds to three sectors, where each sector has eight antennas; each macro cell has 10 Pico cell base stations and single antennas, each corresponding to a Pico cell respectively, that is, each macro cell has 10 Pico cell base stations, where each Pico cell base station corresponds to a Pico cell respectively; each base station corresponds to a 20 MHz spectrum, with the sampling frequency of 30.74 MHz, and 22 bits of each sampling point are quantized. The data rate of connecting the downlink data of the macro base station to the cloud computing center is calculated as follows: $(3\times8+10)\times30.74$ MHz$\times22$ bit=23 Gbps.

However, from the perspective of the joint signal processing gain, it can be discovered that all the UEs do not need to be directly connected to a unified cloud computing node, and that only the UEs at the edge of the cell have visible joint processing gains. If most of baseband data processing and even L2 data processing are performed locally according to the embodiment of the present invention, the data rate needed for connecting to the cloud computing center is greatly reduced: The data rate is reduced by one third after the channel is decoded; if 64 QAM is used, the data rate is reduced by 5/22 after the data is demodulated; if a cyclic prefix (CP, Cyclic Prefix) is removed, the data rate is also reduced; if the L2 data processing can be performed locally, the frame header, CRC check, and control field may be saved. If 10% of transmission bandwidths can be saved by completing the L2 processing, only 20% of user data requires joint processing. The downlink data rate of the LTE is 23 Gbps×20%+23 Gbps×80%×90%× 1/3×5/22=5.8 Gbps. In the uplink, the ratio of the transmission bandwidth saved by performing local processing on the baseband data is close to that saved in the downlink. As known above, the communication system with a lower layer, i.e., a local computing layer, brings about a lot of bandwidth saving advantages.

Even if such problems as the balancing of computing resources and tidal effect brought about by the cloud-RAN architecture are considered, in the multilayer computing architecture provided in this embodiment of the present invention, the computing tasks may also be scheduled on the upper layer and lower layer computing nodes, which does not lose the advantage of the conventional C-RAN architecture.

The second advantage lies in the following aspect: In the conventional C-RAN architecture, each macro base station is required to connect to the computing center through fibers. However, in the near future when a large number of micro base stations are deployed, if all the micro base stations are uniformly connected to the computing center through fibers, the fiber laying costs will be greatly increased. In this embodiment of the present invention, the base station data may be centralized locally within a certain range, and then be transmitted to the upper layer computing center. Because the base station data is centralized locally, multiple short-distance communication technologies may be used, for example, a microwave link, a DSL, and an electrical power cable, to reduce baseband transmission costs. For the conventional C-RAN architecture, if the baseband transmission data rate cannot meet the requirement that all baseband data should be processed through cloud computing, the cloud computing architecture cannot be used. In this embodiment of the present invention, user data that most needs to be processed through cloud computing may be selected according to the baseband data transmission bandwidth, while other data is processed locally, so that the cloud architecture can be used under any circumstances.

Figure 5:
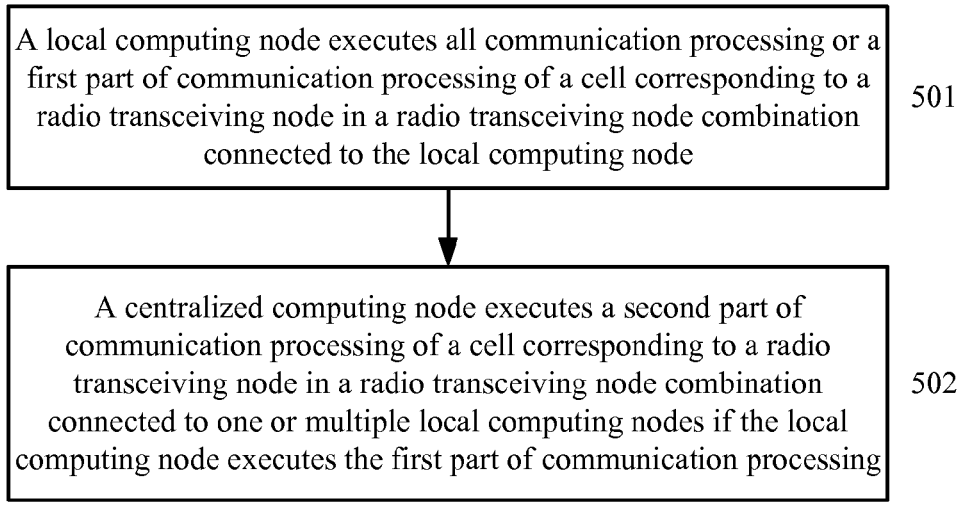
FIG. 5 is a schematic flowchart of a method for managing a communication system according to an embodiment of the present invention.

FIG. 5 is a schematic flowchart of a method for managing a communication system according to an embodiment of the present invention. The method shown in FIG. 5 is executed by the communication system shown in FIG. 1 or FIG. 2. The communication system includes a radio transceiving layer, a local computing layer, and a centralized computing layer. The radio transceiving layer includes one or multiple radio transceiving node combinations, where a radio transceiving node in each radio transceiving node combination includes at least one type of the following: a macro cell radio unit, a Pico cell radio remote unit, and a Pico cell baseband and radio unit. The local computing layer includes one or multiple local computing nodes, where each local computing node is connected to radio transceiving nodes in one or multiple neighboring radio transceiving node combinations. The centralized computing layer includes one or multiple centralized computing nodes, where each centralized computing node is connected to one or multiple local computing nodes in the local computing layer.

Step 501: A local computing node executes all communication processing or a first part of communication processing of a cell corresponding to a radio transceiving node in a radio transceiving node combination connected to the local computing node.

Step 502: A centralized computing node executes a second part of communication processing of a cell corresponding to a radio transceiving node in a radio transceiving node combination connected to one or multiple local computing nodes if the local computing node executes the first part of communication processing, where the all communication processing includes the first part of communication processing and the second part of communication processing.

In this embodiment of the present invention, a local computing layer is added between the centralized computing layer and the radio transceiving layer and is responsible for all or a part of communication processing of neighboring cells within a certain range. In this way, all the processing does not need to be performed by a centralized computing node that is far away, which saves network bandwidth and improves the utilization of system resources.

It should be noted although step 501 is executed before step 502 in FIG. 5, the specific execution sequence is not limited in this embodiment of the present invention. In fact, step 501 and step 502 may be mutually independent, for example, step 501 may be executed after step 502, or step 501 and step 502 are executed at the same time. All these modifications fall within the scope of the present invention.

Figure 6:
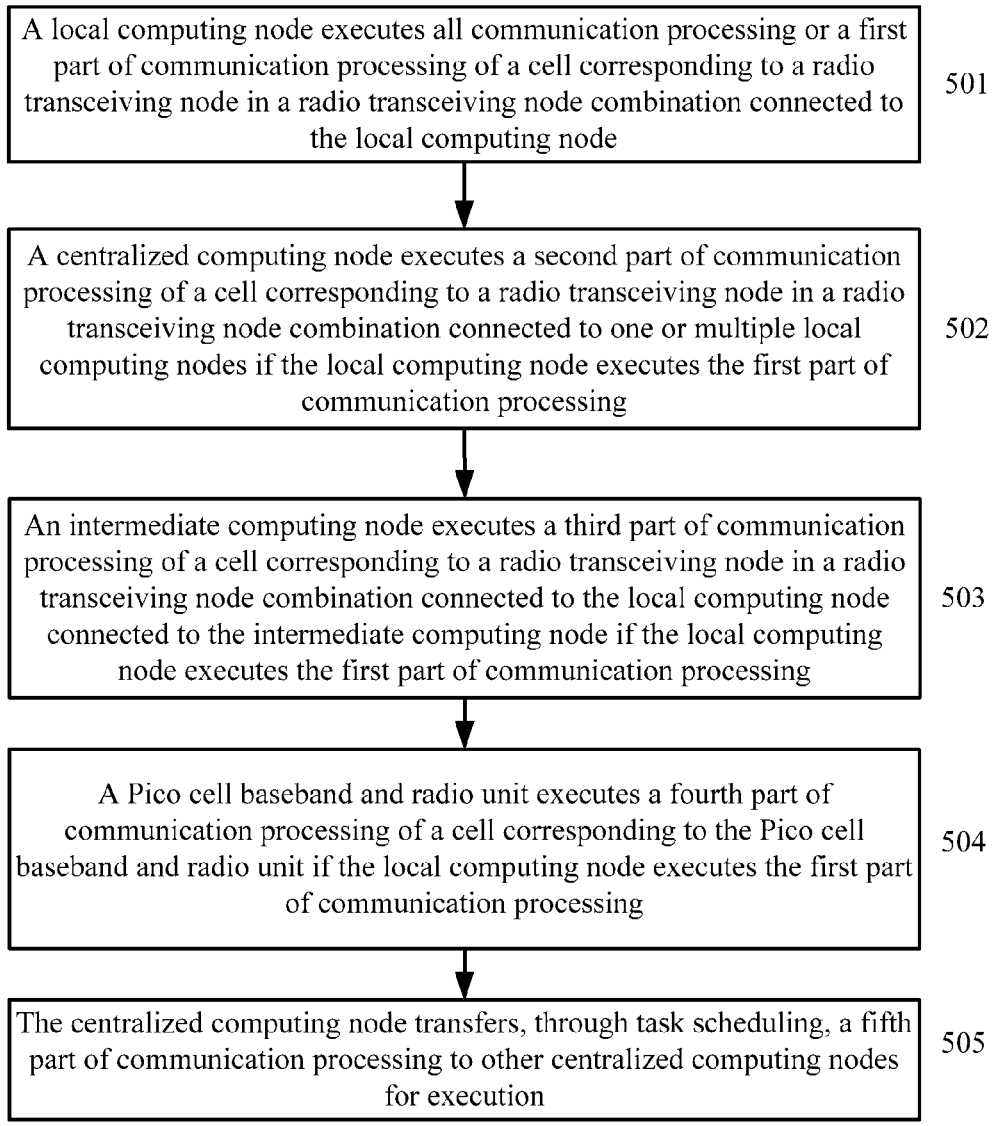
FIG. 6 is a schematic flowchart of a method for managing a communication system according to another embodiment of the present invention.

FIG. 6 is a schematic flowchart of a method for managing a communication system according to another embodiment of the present invention. The communication system provided in the embodiment shown in FIG. 6 is shown in FIG. 2. In some parts of the communication system provided in this embodiment, one or multiple intermediate computing layers 130 may be added between a centralized computing layer 140 and a local computing layer 120 according to the actual requirement to further reduce the bandwidth requirements. Each intermediate computing layer 130 includes one or multiple intermediate computing nodes 135.

In addition to step 501 and step 502 shown in FIG. 5, the method shown in FIG. 6 includes:

Step 503: A intermediate computing node executes a third part of communication processing of a cell corresponding to a radio transceiving node in a radio transceiving node combination connected to the local computing node connected to the intermediate computing node if the local computing node executes the first part of communication processing.

In addition, if a Pico cell BRU also shares some processing tasks, the method shown in FIG. 6 further includes:

Step 504: A Pico cell baseband and radio unit BRU executes a fourth part of communication processing of a cell corresponding to the Pico cell baseband and radio unit if the local computing node executes the first part of communication processing.

Or, when computing tasks are scheduled between the centralized computing nodes 145-1 and 145-2, the method shown in FIG. 6 may further include:

Step 505: A centralized computing node transfers, through task scheduling, a fifth part of communication processing to other centralized computing nodes for execution.

The all communication processing further includes the fourth part of communication processing and/or the fifth part of communication processing.

Processes shown in FIG. 6 may be changed, deleted, or replaced according to the actual need, and all these modifications fall within the scope of the present invention.

The communication processing provided in this embodiment of the present invention may include one or multiple of the following: data processing, joint interference management processing, joint resource scheduling processing, joint computing task scheduling processing, processing of multiple communication systems of different standards, joint processing of multiple communication systems of different standards, and joint control over a working mode or an on-off state of the Pico cell radio remote unit and/or Pico cell baseband and radio unit.

In this embodiment of the present invention, a local computing layer is added between the centralized computing layer and the radio transceiving layer and is responsible for all or a part of communication processing of neighboring cells within a certain range. In this way, all the processing does not need to be performed by a centralized computing node that is far away, which saves network bandwidth and improves the utilization of system resources.

Persons of ordinary skill in the art may be aware that units and algorithm steps provided in each embodiment disclosed herein can be implemented by electronic hardware, computer software, or a combination thereof. To describe the interchangeability between hardware and software clearly, components and steps of each embodiment are already described in the foregoing descriptions according to the function commonalities. Whether these functions are executed by hardware or software depends on specific applications and design constraints of the technical solutions. Those skilled in the art can implement the described functions for each specific application by using different methods, but this implementation should not be deemed as departing from the scope of the present invention.

It is understandable by those skilled in the art that the specific working processes of the foregoing method shown in FIG. 5 and FIG. 6 may refer to corresponding processes provided in embodiments of the communication system. No repeated description is provided herein.

In several embodiments of the present invention, it is understandable that the system, apparatus, and method of the present invention may be implemented through other manners. For example, the above apparatus is only for illustration. For example, the division of the units is only based on logical functions. In the actual implementation, other division manners may be available, for example, multiple units or components may be combined or integrated with another system, or some features may be ignored or not be executed. In addition, the displayed or discussed mutual coupling or direct coupling or communication connection is implemented through some interfaces. The indirect coupling or communication connection between the apparatuses or units may be implemented in electrical, mechanical, or other forms.

The units that are described as separate parts may be separate physically or not. The parts that are displayed as the units may be physical units or not. That is, the parts may be located at one place or distributed on multiple network elements. Some or all of the units may be selected according to the actual need to achieve the purpose of the technical solutions provided in embodiments of the present invention.

In addition, each function unit in embodiments of the present invention may be integrated into a processing unit, or may exist independently, or two ore more units are integrated into a unit. The integrated unit may be embodied in the form of hardware or a software function unit.

If the integrated unit is embodied in the form of a software function unit and is sold or used as a separate product, the integrated unit may be stored in a computer readable storage medium. Based on such understanding, the essence of the technical solutions of the present invention or the contributions to the prior art, or all or a part of the technical solutions may be embodied as a software product. The computer software product is stored in a storage medium, and includes several instructions that enable a computer device (for example, a personal computer, a server, or a network device) to perform the methods provided in the embodiments of the present invention. The preceding storage medium may be any medium that can store program codes, such as a USB disk, a removable hard disk, a read-only memory (ROM), a random access memory (RAM), a magnetic disk, or a CD-ROM.

The above descriptions are merely exemplary embodiments of the present invention, but not intended to limit the scope of the present invention. Any modification or equivalent replacement made by those skilled in the art without departing from the spirit and principle of the present invention should fall within the scope of the present invention. Therefore, the scope of the present invention is subject to the appended claims.

What is claimed is:

1. A communication system, comprising:
   a radio transceiving layer, comprising one or multiple radio transceiving node combinations, wherein a radio transceiving node in each radio transceiving node combination comprises at least one type of the following: a macro cell radio unit, a Pico cell radio remote unit, and a Pico cell baseband and radio unit;
   a local computing layer, comprising one or multiple local computing nodes, wherein each local computing node is connected to radio transceiving nodes in one or multiple neighboring radio transceiving node combinations, and configured to execute all communication processing or a first part of communication processing of a first cell corresponding to a first radio transceiving node combination connected to one of the local computing nodes; and
   a centralized computing layer, comprising one or multiple centralized computing nodes, wherein each centralized computing node is connected to the one or multiple local computing nodes in the local computing layer, and configured to execute a second part of the communication processing of a second cell corresponding to a second radio transceiving node combination connected to the one or multiple local computing nodes if the local computing node executes the first part of the communication processing,
   wherein the all communication processing comprises the first part of the communication processing and the second part of the communication processing.

2. The communication system according to claim 1, wherein that each centralized computing node is connected to the one or multiple local computing nodes in the local computing layer comprises one of the following:
   (a) the centralized computing node is connected to the one or multiple local computing nodes directly; and
   (b) the centralized computing node is connected to the one or multiple local computing nodes through one or multiple intermediate computing nodes, wherein each intermediate computing node is configured to execute a third part of the communication processing of a third cell corresponding to a third radio transceiving node in a third radio transceiving node combination connected to the local computing node connected to the intermediate computing node if the local computing node executes the first part of the communication processing;

wherein the all communication processing further comprises the third part of communication processing.

3. The communication system according to claim 2, wherein:

connections between the macro cell radio unit and the local computing node, between the Pico cell radio remote unit and the local computing unit, between the macro cell radio unit and the centralized computing unit, and between the Pico cell radio remote unit and the centralized computing node are implemented through a class 1 interface, wherein the class 1 interface is configured to transmit baseband data and control state messages;

connections between the Pico cell baseband and radio unit and the local computing node, between the Pico cell baseband and radio unit and the centralized computing node, between the local computing node and the centralized computing node, between the local computing node and the intermediate computing node, between the intermediate computing nodes at upper and lower layers, between the intermediate computing node and the centralized computing node, and between the centralized computing nodes are implemented through a class 2 interface, wherein the class 2 interface is configured to transmit the baseband data, data packets, and the control state messages; and the centralized computing node and a core network are connected through a class 3 interface, wherein the class 3 interface is configured to transmit the data packets and the control state messages.

4. The communication system according to claim 2, wherein the communication processing comprises data processing;

the local computing node divides data to implement at least one of the following: (a) differentiating data that needs to be processed by the local computing node and data that does not need to be processed by the local computing nodes, and (b) aggregating data that has undergone the communication processing;

the intermediate computing node divides data to differentiate data that needs to be processed by the intermediate computing node and data that does not need to be processed by the intermediate computing node; and the centralized computing node divides data to implement at least one of the following (a) differentiating data that needs to be processed by the centralized computing node and data that does not need to be processed by the centralized computing nodes, and (b) aggregating data that has undergone the communication processing.

5. The communication system according to claim 2, wherein the communication processing comprises joint interference management processing;

the local computing node preferably executes one of the following (a) communication processing of a user equipment without visible interference in a cell corresponding to a radio transceiving node in a radio transceiving node combination connected to the local computing node, and (b) interference processing of a user equipment that suffers only interference from other radio transceiving nodes in a radio transceiving node combination connected to the local computing node;

the intermediate computing node executes interference processing of a user equipment in a cell corresponding to a radio transceiving node in a radio transceiving node combination connected to a lower layer intermediate computing node or a local computing node connected to the intermediate computing node; wherein the user equipment suffers interference of a cell corresponding to a radio transceiving node in a radio transceiving node combination connected to the other lower layer intermediate computing nodes or a local computing node connected to the intermediate computing node; and the centralized computing node preferably executes interference processing of a user equipment in a cell corresponding to a radio transceiving node in a radio transceiving node combination connected to a lower layer intermediate computing node or a local computing node connected to the centralized computing node, wherein the user equipment suffers interference of a cell corresponding to a radio transceiving node in a radio transceiving node combination connected to other lower layer intermediate computing nodes or a local computing node connected to the centralized computing node.

6. The communication system according to claim 2, wherein the communication processing comprises joint resource scheduling processing;

the local computing node executes resource scheduling between cells corresponding to a radio transceiving node in a radio transceiving node combination connected to the local computing node;

the intermediate computing node executes resource scheduling between cells corresponding to a radio transceiving node in a radio transceiving node combination connected to the intermediate computing node; and the centralized computing node executes resource scheduling between cells corresponding to a radio transceiving node in a radio transceiving node combination connected to the centralized computing node.

7. The communication system according to claim 6, wherein:

resources scheduled by the local computing node, the intermediate computing node, and the centralized computing node are configured differently, or an upper layer computing node executes resource scheduling.

8. The communication system according to claim 2, wherein a connection between the radio transceiving node in the radio transceiving node combination and the local computing node, between the local computing node and the intermediate computing node, or between the intermediate computing nodes at upper and lower layers is implemented through one of the following: a fiber, a digital subscriber line, a microwave link, and an electrical power cable.

9. The communication system according to claim 8, wherein a connection medium between nodes is determined based on at least one of the following: a node computing capability, an inter-node distance, an inter-node transmission bandwidth requirement, and an inter-node transmission delay requirement.

10. The communication system according to claim 2, wherein the communication processing comprises joint computing task scheduling processing; and a computing task is mutually transferred, according to computing loads, computing capabilities, transmission bandwidth, and transmission delays, between the local computing node and the intermediate computing node connected to the local computing node, between intermediate computing nodes connected at upper and lower layers, between the intermediate computing node and the centralized computing node connected to the intermediate computing node, and between interconnected centralized computing nodes.

11. The communication system according to claim 10, wherein:
   a computing node schedules the transfer of the computing task based on requests of other computing nodes; or
   a computing node at the upper layer schedules the transfer of the computing task.

12. The communication system according to claim 2, wherein the radio transceiving node combination comprises radio transceiving nodes supporting multiple standards and the communication processing comprises at least one of the following (a) processing of multiple communication systems of different standards, and (b) joint processing of multiple communication systems of different standards.

13. The communication system according to claim 1, wherein:
   the Pico cell baseband and radio unit is configured to execute a fourth part of communication processing of a fourth cell corresponding to the Pico cell baseband and radio unit if the local computing node executes the first part of the communication processing; or
   the centralized computing node is configured to transfer, through task scheduling, a fifth part of the communication processing to other centralized computing nodes for execution;
   wherein the all communication processing further comprises at least one of the fourth part of communication processing and the fifth part of communication processing.

14. The communication system according to claim 1, wherein the connecting each local computing node to one or multiple neighboring radio transceiving node combinations comprises:
   determining, according to network configurations, a radio transceiving node in a radio transceiving node combination connected to the local computing node and the number of connected radio transceiving node combinations.

15. The communication system according to claim 1, wherein the local computing node is connected to a radio transceiving node in a radio transceiving node combination, wherein the radio transceiving node combination comprises at least one of a macro cell radio unit co-sited with the local computing node, a Pico cell radio remote unit in coverage of the macro cell radio unit, and a Pico cell baseband and radio unit.

16. The communication system according to claim 1, wherein the local computing node is connected to a radio transceiving node in a radio transceiving node combination, wherein the radio transceiving node combination comprises a Pico cell radio remote unit and a Pico cell baseband and radio unit in a specified area, wherein the specified area is determined according to network configurations.

17. The communication system according to claim 16, wherein the communication processing comprises joint control over a working mode or an on-off state of one of the Pico cell radio remote unit and Pico cell baseband and radio unit in the radio transceiving node combination.

18. A method for managing a communication system, wherein the communication system comprises a radio transceiving layer, a local computing layer, and a centralized computing layer, wherein: the radio transceiving layer comprises one or multiple radio transceiving node combinations, wherein a radio transceiving node in each radio transceiving node combination comprises at least one type of the following: a macro cell radio unit, a Pico cell radio remote unit, and a Pico cell baseband and radio unit; the local computing layer comprises one or multiple local computing nodes, wherein each local computing node is connected to radio transceiving nodes in one or multiple neighboring radio transceiving node combinations; and the centralized computing layer comprises one or multiple centralized computing nodes, wherein each centralized computing node is connected to one or multiple local computing nodes in the local computing layer; and
   the method comprises:
      executing, by the local computing node, all communication processing or a first part of communication processing of a first cell corresponding to a first radio transceiving node in a radio transceiving node combination connected to one of the local computing nodes; and
      executing, by the centralized computing node, a second part of the communication processing of a second cell corresponding to a second radio transceiving node in a radio transceiving node combination connected to one or multiple local computing nodes if the local computing node executes the first part of the communication processing,
   wherein the all communication processing comprises the first part of the communication processing and the second part of communication processing.

19. The method according to claim 18, wherein the centralized computing node is connected to the local computing node through one or multiple intermediate computing nodes; and
   the method further comprises:
      executing, by the intermediate computing node, a third part of the communication processing of a third cell corresponding to a third radio transceiving node in third a radio transceiving node combination connected to the local computing node connected to the intermediate computing node if the local computing node executes the first part of the communication processing;
   wherein the all communication processing further comprises the third part of communication processing.

20. The method according to claim 18, further comprising:
   executing, by the Pico cell baseband and radio unit, a fourth part of communication processing of a fourth cell corresponding to the Pico cell baseband and radio unit if the local computing node executes the first part of the communication processing; or
   transferring, by the centralized computing node, through task scheduling, a fifth part of the communication processing to other centralized computing nodes for execution;
   wherein the all communication processing further comprises at least one of the fourth part of communication processing and the fifth part of communication processing.

21. The method according to claim 18, wherein the communication processing comprises one or multiple of the following: data processing, joint interference management processing, joint resource scheduling processing, joint computing task scheduling processing, processing of multiple communication systems of different standards, joint processing of multiple communication systems of different standards, and joint control over a working mode or an on-off state of one of the Pico cell radio remote unit and Pico cell baseband and radio unit.

* * * * *

UNITED STATES PATENT AND TRADEMARK OFFICE
CERTIFICATE OF CORRECTION

| | | |
|---|---|---|
| PATENT NO. | : 8,467,818 B2 | Page 1 of 1 |
| APPLICATION NO. | : 13/622196 | |
| DATED | : June 18, 2013 | |
| INVENTOR(S) | : Liu et al. | |

It is certified that error appears in the above-identified patent and that said Letters Patent is hereby corrected as shown below:

Title page, Item (71) Applicant's City "Guangdong (CN)" should read -- Shenzhen (CN) --.

Signed and Sealed this
First Day of October, 2013

Teresa Stanek Rea
*Deputy Director of the United States Patent and Trademark Office*